United States Patent Office 3,336,249
Patented Aug. 15, 1967

3,336,249
HALOBENZOIC ACID LATENT CATALYSTS FOR AMINOPLAST MOLDING COMPOSITIONS
Nicholas R. Segro, Baltimore, Md., assignor to FMC Corporation, New York, N.Y., a corporation of Delaware
No Drawing. Filed May 5, 1966, Ser. No. 547,767
5 Claims. (Cl. 260—17.3)

This application is a continuation-in-part of copending application, Ser. No. 465,186 filed June 18, 1965 and now abandoned.

This invention relates to aminoplast molding compositions prepared from synthetic resins of the amino-formaldehyde type, and aims to provide compositions of this character which have good storage stability combined with high rates of cure, which results are obtained by the use of novel curing agents, of the group consisting of o-bromobenzoic acid, o-chlorobenzoic acid and 2,4-dichlorobenzoic acid.

Aminoplast resins are made by the reaction of amino compounds such as urea, biuret, melamine, ammeline and benzoguanamine with formaldehyde, and are most widely used in the preparation of thermosetting molding compositions. The resins are first reacted to the so-called "B" stage in which they are still soluble and fusible, and are then conventionally blended with fillers, mold lubricants, stabilizers and pigments as desired, together with an acidic material which acts as a curing agent to promote curing of the resin to the insoluble and infusible state during the molding operation. The principal problem in the use of these curing agents is that they act not only during the molding procedure, at high temperature and pressures, but they also advance the cross-linking of the resin at ordinary storage temperatures, thereby decreasing the flow of the material during molding and substantially reducing moldability.

There has therefore been a need to find curing promoters with minimum action during storage, and this invention is directed primarily to a solution of this problem.

I have discovered that certain halobenzoic acids—to wit, o-bromobenzoic acid, o-chlorobenzoic acid and 2,4-dichlorobenzoic acid are excellent cure accelerators for amino-formaldehyde resin molding compositions, providing rapid cure under ordinary molding conditions while, at the same time, acting slowly in normal storage so that the compounds are essentially storage stable for prolonged periods of time.

The invention may be practiced with any of the known thermosetting amino-formaldehyde resins of which urea-formaldehyde and melamine-formaldehyde are the principal commercial examples. These resins are generally made by combining urea, melamine or other amino compound with a molar excess of formaldehyde, the reaction being generally run in water at a somewhat elevated temperature, to produce an aqueous solution of a water soluble reaction product (B stage resin). This B stage resin solution is blended with a reinforcing filler (most generally, alpha-cellulose) in a mixer and then the dried composite is combined with other ingredients and ground in a ball mill to give a blended powder which may be used as such, or which may be densified by compaction and then granulated to give a molding powder of controlled particle size.

While the most commonly used reinforcing filler is shredded alpha-cellulose, other fillers, reinforcing or non-reinforcing, may be used—for example, wood flour, glass fibers and asbestos as reinforcing fillers and clay, talc, and the like as non-reinforcing fillers.

A second ingredient of the composition is generally an internal mold release agent or mold lubricant. Zinc stearate is the most generally used lubricant, but higher fatty acids, their soaps, and related compounds, such as glyceryl monostearate, are also used. The particular mold lubricant used is of no consequence in this invention.

Similarly, if it is desired to impart a color to the composition, pigments may be added. Titanium dioxide is generally added in a small amount to give the product a white look, but color pigments can be added to impart any desired shade to the molding compound. It is only essential that the pigment be stable under the molding conditions. Almost all inorganic pigments can be used, as well as many organics, including the vat pigments, phthalocyanine greens and blues, and the like.

In order to get a satisfactory rate of cure, there is added to the composition a small percentage, generally about one-tenth to one percent by weight, of an acid accelerator, generally in conjunction with hexamethylene tetramine which acts to stabilize the composition against premature curing. The hexamethylene tetramine is usually present in amounts from about one-half of, to equal parts by weight with, the accelerator.

In accordance with the present invention, I used as the accelerator a halobenzoic acid selected from the class consisting of o-bromobenzoic acid, o-chlorobenzoic acid and 2,4-dichlorobenzoic acid. These are preferably used as the sole cure accelerators, although I have successfully combined them with methyl p-toluenesulfonate and ethyl p-toluenesulfonate with good results. Strangely enough, closely related compounds like p-chlorobenzoic acid and 2,6-dichlorobenzoic acid do not provide anything like the effective cure combined with storage stability obtained with the accelerators of this invention.

The following specific examples are given without any intention that the invention be limited thereto.

EXAMPLES 1 TO 9

600 parts by weight of urea, 908 parts by weight of 44% formaldehyde were combined at 77° F. and the pH was adjusted to between 9 and 10 with triethylamine and formic acid. The solution was heated to about 140° F. and held for a period of 20 minutes until the free formaldehyde content was reduced to below 3%. The resin solution thus obtained was mixed with 429 parts by weight of alpha-cellulose in a dough mixer for 15 minutes at 120° F. It was then discharged onto trays, and oven-dried in a controlled atmosphere (190° F. dry bulb temperature, 115° F. wet bulb temperature) until the free moisture content of the dried product was below 1%. The cake was broken up and 100 parts by weight of the broken-up mixture of resin and alpha-cellulose was combined with the amounts of accelerator and stabilizer indicated in the table, and with 0.2 part by weight of zinc stearate and 0.2 part by weight of titanium dioxide. The mixtures were ground in a ball mill to a −30 mesh powder and the powder was molded.

TABLE I.—EXAMPLES 1 TO 9

| | Parts by Weight Accelerator | Parts by Weight Hexamethylene Tetramine | Disk Cure (seconds) | Original Flow (p.s.i.) | Flow After Aging (p.s.i.) |
|---|---|---|---|---|---|
| 1 | 0.6 o-chlorobenzoic acid | 0.4 | 60 | 1,400 | 2,236 |
| 2 | 0.5 o-chlorobenzoic acid | 0.3 | 55 | 1,235 | 2,054 |
| 3 | 0.4 o-chlorobenzoic acid | 0.3 | 65 | 1,050 | 1,318 |
| 4 | 0.3 o-chlorobenzoic acid, 0.3 ethyl p-toluenesulfonate. | 0.4 | 60 | 907 | 1,426 |
| 5 | 0.5 2,4-dichlorobenzoic acid | 0.3 | 70 | 1,172 | 1,519 |
| 6 | 0.6 2,4-dichlorobenzoic acid | 0.3 | 65 | 1,311 | 2,128 |
| 7 | 0.64 o-bromobenzoic acid | 0.4 | 60 | 819 | 1,517 |
| 8 | ----do---- | 0.3 | 55 | 831 | 3,000 |
| 9 | 0.30 o-bromobenzoic acid | 0.1 | 60 | 759 | 2,909 |

The disk cure is the time needed to give a blister and gas-free disk, 2 inches by ⅛ inch at 300° F. and 6,000 p.s.i. In general, any number under 120 seconds is fast.

The flow is the pounds per square inch pressure required to obtain a 1 inch extrusion through a ⅛ inch orifice from 0.8 gram preform at 300° F., using an Olsen-Bakelite flow tester; it should be preferably something under 1500 p.s.i.

The flow after aging is obtained by storing for 14 days at 100° F. to simulate long-term storage, and is obtained with the same machine and under the same conditions as for the original flow. Any figure above 3,000 p.s.i. is poor. It will be noted that all of these examples give good storage stability.

EXAMPLES 10 TO 12

The resin-filler combination of Example 1 was duplicated, except that the amount of filler was reduced by about one-tenth.

The indicated amounts of accelerator and stabilizer were used, along with 0.2 zinc stearate and 0.2 titanium dioxide. The following results were obtained:

TABLE II.—EXAMPLES 10 TO 12

| | Parts by Weight Accelerator | Parts by Weight Hexamethylene Tetramine | Disk Cure (seconds) | Original Flow (p.s.i.) | Flow After Aging (p.s.i.) |
|---|---|---|---|---|---|
| 10 | 0.5 o-chlorobenzoic acid | 0.3 | 60 | 1,022 | 1,455 |
| 11 | 0.4 o-chlorobenzoic acid, 0.3 methyl p-toluenesulfonate. | 0.4 | 60 | 1,296 | 1,723 |
| 12 | 0.6 2,4-dichlorobenzoic acid | 0.3 | 60 | 814 | 1,185 |

EXAMPLE 13

800 parts by weight of melamine, 863 parts by weight of formalin (44% formaldehyde), 300 parts by weight of water were slurried together and the pH adjusted to 8.5 with sodium hydroxide and formic acid. The slurry was heated to 200° F. and held for about an hour, to give an aqueous resin solution which is carried to the point where a sample of the syrup just produces a haziness when added to 50° F. water. The resin syrup was combined with 450 parts by weight of shredded alpha-cellulose in a dough mixer at 120° F. The filled resin was then dried in an oven (200° F. dry bulb, 100° F. wet bulb) to a free moisture content of 1%.

The product was blended as in Example 1, with 0.2 part by weight of o-chlorobenzoic acid, 0.1 part by weight of hexamethylene tetramine, 0.50 part by weight of zinc stearate, and 0.40 part by weight of titanium dioxide.

The −30 mesh powder produced was then molded as in Examples 1–9. The product had an original disk cure of 80 seconds and an original flow of 1340 p.s.i., and a flow after aging of approximately 1800 p.s.i.

These results are in contrast to conventional curing agents such as phthalic anhydride which, on similar aging tests, will go from original flows to the order of 800 to 900 p.s.i. to flows well in excess of 2500 p.s.i. under similar storage conditions.

EXAMPLE 14

When Example 13 was repeated, using o-bromobenzoic acid, similar results were obtained.

Obviously, the examples can be multiplied indefinitely without departing from the scope of the invention which is defined in the claims.

I claim:
1. A molding powder consisting essentially of a filled amino-formaldehyde resin and containing as a cure accelerator from about 0.1 to about 1.0 part by weight of a halobenzoic acid selected from the group consisting of o-chlorobenzoic acid, o-bromobenzoic acid, and 2,4-dichlorobenzoic acid.

2. The composition of claim 1 in which the resin is a urea formaldehyde resin.

3. The composition of claim 1 in which the resin is a melamine formaldehyde resin.

4. The composition of claim 2 in which the filler is alpha-cellulose.

5. The composition of claim 3 in which the filler is alpha-cellulose.

References Cited

UNITED STATES PATENTS 2,469,157   5/1949   Cordier _____ 260—17.3
2,520,100   8/1950   Morfit _____ 260—17.3
2,725,362   11/1955  Gaver et al. _____ 260—17.3

WILLIAM H. SHORT, *Primary Examiner.*

SAMUEL H. BLECH, *Examiner.*

E. M. WOODBERRY, *Assistant Examiner.*